(12) United States Patent
Witmond et al.

(10) Patent No.: US 7,003,376 B2
(45) Date of Patent: Feb. 21, 2006

(54) METHOD FOR TRACKING A MAIL PIECE

(75) Inventors: Rod Witmond, Alpharetta, GA (US); Rana Dutta, Shelton, CT (US); Pascal Charroppin, Trumbull, CT (US)

(73) Assignee: Mailroom Technology, Inc., Shelton, CT (US)

( * ) Notice: Subject to any disclaimer, the term of this patent is extended or adjusted under 35 U.S.C. 154(b) by 0 days.

(21) Appl. No.: 10/768,897

(22) Filed: Jan. 30, 2004

(65) Prior Publication Data
US 2005/0171632 A1 Aug. 4, 2005

(51) Int. Cl.
*G06F 7/00* (2006.01)

(52) U.S. Cl. .................. 700/225; 700/213; 700/227; 235/375

(58) Field of Classification Search .............. 700/213, 700/219–225, 227
See application file for complete search history.

(56) References Cited
U.S. PATENT DOCUMENTS

| | | | | |
|---|---|---|---|---|
| 5,697,504 A | * | 12/1997 | Hiramatsu et al. | 209/546 |
| 5,703,783 A | * | 12/1997 | Allen et al. | 700/213 |
| 5,770,841 A | * | 6/1998 | Moed et al. | 235/375 |
| 5,862,243 A | * | 1/1999 | Baker et al. | 382/101 |
| 6,292,709 B1 | * | 9/2001 | Uhl et al. | 700/226 |
| 6,665,422 B1 | * | 12/2003 | Seidel et al. | 382/101 |
| 6,740,836 B1 | * | 5/2004 | Ryan et al. | 209/584 |
| 6,796,433 B1 | * | 9/2004 | Daniels et al. | 209/384 |
| 6,813,541 B1 | * | 11/2004 | Schlegel | 700/224 |
| 6,819,777 B1 | * | 11/2004 | Baker et al. | 382/101 |
| 6,878,896 B1 | * | 4/2005 | Braginsky et al. | 209/583 |

\* cited by examiner

*Primary Examiner*—Khoi H. Tran

(57) ABSTRACT

A system and method for tracking a mail piece includes capturing an image of the mail piece, associating a tracking number for the mail piece with the image, providing the mail piece and tracking number to a carrier, and utilizing information from the image to investigate a lack of delivery if no delivery verification is received from the carrier within a certain time period. The system and method may also include extracting information from a portion of the image and presenting the extracted information to a carrier, receiving additional information related to the mail piece from the carrier in response to presenting the extracted information, providing the mail piece, the additional information, and a tracking number for the mail piece to a carrier, inserting the mail piece into a mail stream, and then utilizing information from the image to investigate a lack of delivery if no delivery verification is received from the carrier within a certain time period.

5 Claims, 2 Drawing Sheets

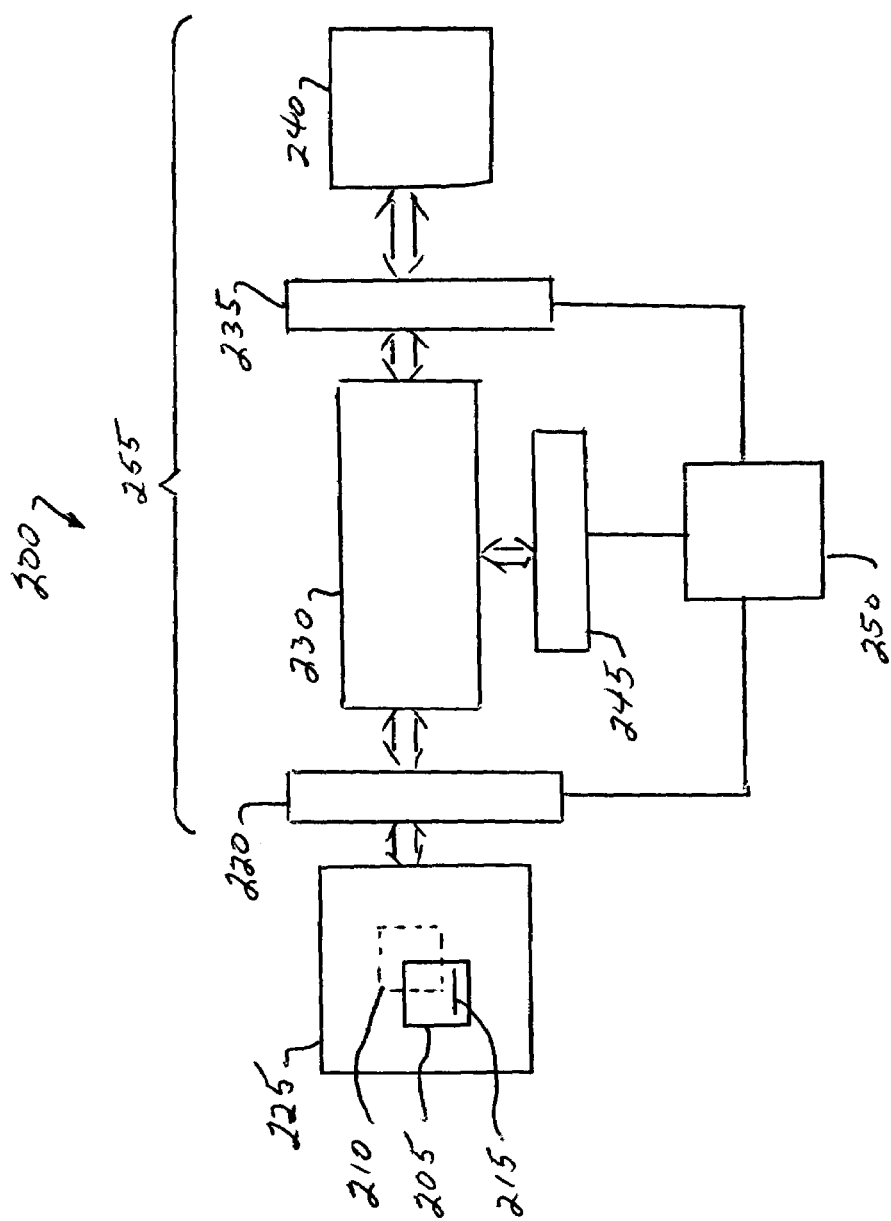

METHOD FOR TRACKING A MAIL PIECE

BACKGROUND

1. Field of the Invention

The present invention relates to processing mail pieces and, more particularly, to a system and process for verifying the status of a mail piece in a mail stream.

2. Brief Description of Related Developments

Timely delivery of certain mail pieces may be important. There may also be a need to monitor or track the progress of a mail piece to identify its location, to predict its delivery date, and to verify its actual delivery.

One known method of determining the delivery status a mail piece is used by the US postal service to determine at which post office the mail piece is presently located.

Another known method includes providing a postcard or other return mail piece with the original piece of mail. Upon delivery, the return mail piece is filled out and mailed back to the originator.

It would be advantageous to provide a more automated and informative system that allows a user to verify the location and status of a mail piece in a mail stream.

SUMMARY OF THE INVENTION

The present invention is directed to a system and method for tracking a mail piece that includes capturing an image of the mail piece, associating a tracking number for the mail piece with the image, providing the mail piece and tracking number to a carrier, and utilizing information from the image to investigate a lack of delivery if no delivery verification is received from the carrier within a certain time period or if a notice of non delivery is received from the carrier within a certain time.

In another embodiment, the present invention is directed to a system and method for tracking a mail piece that includes capturing an image of the mail piece, extracting information from a portion of the image and presenting the extracted information to a carrier, receiving additional information related to the mail piece from the carrier in response to presenting the extracted information, providing the mail piece, the additional information, and a tracking number for the mail piece to a carrier, inserting the mail piece into a mail stream, and utilizing the information extracted from the image and/or the tracking number to request the status of the mail piece.

BRIEF DESCRIPTION OF THE DRAWINGS

The foregoing aspects and other features of the present invention are explained in the following description, taken in connection with the accompanying drawings, wherein:

FIG. 2 shows a diagram of another system in accordance with the invention.

DETAILED DESCRIPTION OF THE PREFERRED EMBODIMENT(S)

Figure 1:
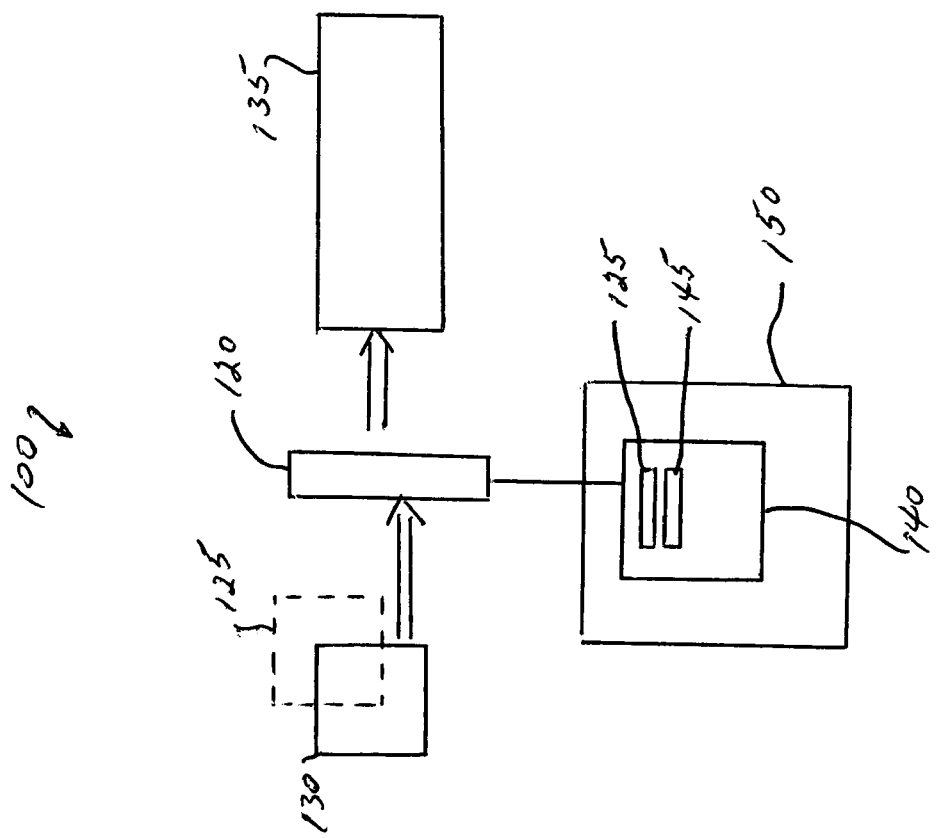
FIG. 1 is a block diagram of a mail verification system in accordance with the disclosed embodiments.

Referring to FIG. 1, a diagram of a system 100 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, in one embodiment of the invention, system 100 generally comprises a data capture function 120 and a data base function 140. An image 125 of a mail piece 130 is captured by data capture function 120 and a tracking number 145 is assigned. For example, system 100 may read the tracking number and associate it to the scanned image. Alternately, system 100 may print the tracking number and associate it to the scanned image. By its nature the racking number is unique and may also provide information on the nature of service required to the carrier, such as delivery confirmation, signature confirmation, express delivery, etc. The rate applied to the mail piece will vary accordingly.

Tracking number 145 and image 125 are stored in database 140 and the mail piece is submitted to the carrier. In this embodiment of the invention, if no delivery verification is received from carrier 135 within a certain time period, a user may access the image to determine information related to delivery, for example, zip code, addressee, etc., and attempt to resolve the delivery problem.

In another embodiment of the invention, information is extracted from a certain portion of the mail piece image 125 and used to process the mail piece. When presented with the extracted portion, the carrier 135 replies with additional information regarding the mail piece 130. For example, the addressee's name may be extracted from the image 125 and presented to the carrier 135 with the mail piece and the tracking number 145. The carrier 135 may respond with a correct address for the given name and provide the status of the mail piece 130 periodically or as requested. As another example, the zip code of the addressee may be extracted and presented to the carrier 135. The carrier 135 may respond with the tracking number 145 and status of one or more mail pieces having that zip code. It is an aspect of this embodiment that a service provider may provide the extraction function and the information exchange with the carrier, and may present the mail piece information to a user in a specified format. In another aspect of this embodiment, the carrier may provide the extraction function.

In another embodiment of the invention, all available mail piece information is extracted from image 125 and used to automatically process the mail piece 130. In this embodiment, all available mail piece information, once extracted, is associated directly with the tracking number 145 and presented to carrier 135. Carrier 135 then utilizes the information to process the mail piece through the mail stream. It is also an aspect of this embodiment that a service provider may provide the extraction function and the information exchange with the carrier, and may present the mail piece information to a user in a specified format. In another aspect of this embodiment, the carrier may provide the extraction function.

In the embodiments described herein, database 140 may reside locally, that is at a user or customer location, on a network such as a local area network (LAN), or within a service provider's infrastructure. When database 140 is located on a network or within an infrastructure, mail piece information may be presented through a web site or other type of interface, depending on the user's viewing capabilities.

Also in the embodiments described herein, data for each transaction may be exchanged with the carrier at the time of each transaction. Alternately, data may be exchanged with the carrier in a batch mode, for example, a connection may be established at a certain time for a certain time period, and data may be exchanged for all transactions occurring between connection times. As another example, data may be exchanged with the carrier after a certain number of transactions have occurred.

FIG. 2 shows a diagram of a more complex system 200 incorporating features of the invention. The system 200 generally comprises a function where information is read from and additional information may be added to a mail piece, represented by a first interface 220 between a mail piece originator 225 and a mail carrier 230, a function where information is read from a mail piece and conveyed to a recipient, represented by a second interface 235 between mail carrier 230 and a mail recipient 240, and an information exchange function 245 where a service provider 250 exchanges information with the mail carrier 230. First interface 220, second interface 235, and information exchange function 245 are generally controlled by service provider 250.

System operations generally include reading and adding information to a mail piece at first interface 220, exchanging information between a service provider 250 and a mail carrier 230 while the mail piece travels through a mail stream, and reading information on a mail piece at the second interface 235. Service provider 250 may provide status and location information to originator 225 and recipient 240 as the mail piece travels through a mail stream. For purposes of the disclosed embodiments, an exemplary mail stream 255 includes first interface 220, transport by carrier 230, second interface 235, and recipient 240.

The components of system 200 may each include a microprocessor, on-board memory, an analog to digital converter, a real time clock interrupt controller, a power source, mail handling equipment, scanning equipment, and communication circuitry. The microprocessor may operate under the control of programs found in the on board memory. The on board memory may provide storage information associated with the operation of the particular system component. The on board memory may be configured as a non-volatile memory which retains its contents in the event of a power loss.

Each of the system components may be connected through a network, for example, a postal infrastructure. The components may communicate through a link that may include any suitable communications network, for example, the Public Switched Telephone Network (PSTN), a wireless network, a wired network, a Local Area Network (LAN), a Wide Area Network (WAN), virtual private network (VPN) etc. The franking device and the remote device may communicate bi-directionally over the link using any suitable protocol, or modulation standard, for example, X.25, ATM, TCP/IP, V34, V90, etc.

As a mail piece 205 is originated, an image 210 of mail piece 205 is captured. A scanner, camera, or other suitable equipment may be used for image capture. From image 210, information about the recipient and information about the mail piece, for example, address, size and weight may be determined at first interface 220. Other information already present on the mail piece, for example, a tracking number 215, a Postnet code, or a ZIP+4 code, may also be captured. From this information, first interface 220, or service provider 250, may determine any one of, or any combination of, a Postnet code, a ZIP+4 or ZIP+4+2 code, the name of the addressee, a return address code, a mail class, an indicia, planet code, or any other type of suitable information.

For example, a mail piece may be scanned at first interface 220 and the address on the mail piece may be determined. The weight and size of the mail piece may also be measured. First interface 220 may communicate this information to service provider 250. Service provider 250 may access a standardized address database maintained by carrier 230 to verify or correct the address. Service provider may also access rates maintained by carrier 230 and may determine a class, rate, corrected address, a return address code, a ZIP+4 or ZIP+4+2 code, a postal value or indicia, a planet code, etc., or any other mailing related information, either alone or in combination. This information may be conveyed to first interface 220. In another embodiment, the weight, size, and address information of the mail piece may be provided directly to the carrier and which may return a corrected address, a ZIP+4 or ZIP+4+2 code, a postal value or indicia, a planet code, etc., either alone or in combination.

The determined information may optionally be applied to the mail piece at interface 220. An image of the mail piece may also be stored and associated with the determined information, information read from the mail piece, a tracking number associated with the mail piece, or any combination thereof. Service provider 250 may provide the tracking number to carrier 230.

The mail piece may then be introduced into mail stream 255. As the mail piece is transported by carrier 230, service provider 250 may poll carrier 230 for location and status information, for example, by using the tracking number, and provide the information to originator 225 and to recipient 240. For example, once the mail piece is introduced into the mail stream, service provider 250 may poll carrier 230 a number of times per day to ascertain the location of the mail piece as designated by a tracking number. Carrier 230 may provide status information which may include a list of facilities and the respective entry and exit times of the mail piece. Service provider 250 may in turn provide this information to originator 225 and recipient 240. In one embodiment, carrier 230 may capture another image of the mail piece at each facility and provide the image as part of the evidence or proof that the mail piece has entered or left the particular facility. In one aspect of this invention, if service provider 250 fails to receive status information, after a period of time, image 210, the determined information, or the information read from mail piece 205, may be retrieved and used to resolve any delivery problems.

Carrier 230 delivers the mail piece to second interface 235 for delivery to a recipient. Upon receipt at second interface 235, yet another image of the mail piece may be captured, time and date of delivery and reception may be recorded, information present on the mail piece may be read, and the recipient may be determined. The mail piece may then be delivered to the recipient. In one embodiment, image capture, information recognition, and time stamping at second interface 235 may be performed by a particular device, for example, a mailing machine or a handheld device.

Thus, system 200 provides a method for verifying the status and location of a mail piece as it travels through a mail stream. A system user may be able to determine the location and status of a mail piece at any carrier facility that may provide a tracking function. A system user may also be able to retrieve and view an image of the actual mail piece at each tracking point in order to verify transport through a particular facility and to verify delivery to recipient 240. The captured images of the mail piece may allow a user, including originator 225 or recipient 240, to verify delivery of mail pieces by exception, that is, to identify which mail pieces have not arrived at a tracking point or recipient by a particular time and to initiate an investigation.

It should be understood that the foregoing description is only illustrative of the invention. Various alternatives and modifications can be devised by those skilled in the art without departing from the invention. Accordingly, the present invention is intended to embrace all such alternatives, modifications and variances.

What is claimed is:

1. A method of tracking a mail piece comprising:
capturing an image of the mail piece;
associating a tracking number for the mail piece with the image;
providing the mail piece and tracking number to a carrier; and
utilizing information from the image to investigate a lack of delivery if no delivery notification is received from the carrier within a certain time period.

2. A method of tracking a mail piece comprising:
capturing an image of the mail piece;
extracting information from a portion of the image and presenting the extracted information to a carrier;
providing the mail piece, the additional information, and a tracking number for the mail piece to a carrier;
inserting the mail piece into a mail stream;
receiving additional information related to the mail piece from the carrier in response to presenting the extracted information; and
utilizing information from the image to investigate a lack of delivery if no delivery verification is received from the carrier within a certain time period.

3. The method of claim 1 further comprising extracting information from a portion of the image to automatically process the mail piece.

4. The method of claim 1 further comprising:
extracting information from a portion of the image and presenting the extracted information to a carrier; and
receiving additional information regarding the mail piece from the carrier in response.

5. The method of claim 4, wherein a mail service provider extracts the information and receives the information, and wherein the mail service provider presents a portion of the extracted information and a portion of the additional information to a user.

* * * * *